United States Patent [19]

Buriks et al.

[11] Patent Number: 5,151,195
[45] Date of Patent: Sep. 29, 1992

[54] FLOTATION-AID COMPOSITION AND METHOD OF USE THEREOF

[75] Inventors: Rudolf S. Buriks; Allen R. Fauke, both of St. Louis, Mo.

[73] Assignee: Petrolite Corporation, St. Louis, Mo.

[21] Appl. No.: 232,822

[22] Filed: Aug. 11, 1988

Related U.S. Application Data

[63] Continuation of Ser. No. 868,470, May 30, 1986.

[51] Int. Cl.$^5$ .............................................. B01D 15/00
[52] U.S. Cl. .................................... 210/705; 210/708; 210/734
[58] Field of Search ................ 526/304, 307; 210/705, 210/708, 734

[56] References Cited

U.S. PATENT DOCUMENTS

| | | | |
|---|---|---|---|
| 2,980,657 | 4/1961 | Melamed | 564/204 |
| 4,532,052 | 7/1985 | Weaver et al. | 525/385 |
| 4,767,550 | 8/1988 | Harlon et al. | 526/304 |
| 4,777,218 | 10/1988 | Reimschuessel et al. | 526/304 |
| 4,966,712 | 10/1990 | Nishibayashi et al. | 210/705 |

*Primary Examiner*—Thurman K. Page
*Assistant Examiner*—Peter F. Kulkosky
*Attorney, Agent, or Firm*—Stanley M. Tarter

[57] ABSTRACT

Copolymers of an acrylic compound and a polymerizable quaternary ammonium compound are useful as flotation-aids for removing oils and/or solid materials from aqueous systems. The polymerizable quaternary ammonium compounds are 1-alkoxy-2-hydroxy propyl quaternaries of N-(N'N'-dialkylaminoalkyl)acrylamides.

5 Claims, No Drawings

FLOTATION-AID COMPOSITION AND METHOD OF USE THEREOF

This application is a continuation of application Ser. No. 868,470, filed May 30, 1986.

BACKGROUND OF THE INVENTION

1. Field of the Invention

This invention relates to novel compositions useful as flotation-aids, to novel intermediates useful for preparing such compositions, and to methods of use of such compositions and intermediates.

More particularly, the present invention relates to novel flotation-aid compositions comprising a copolymer of an acrylic compound with a novel polymerizable quaternary ammonium compound having the general formula

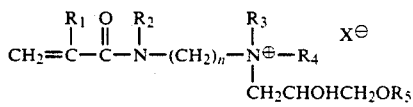

wherein $R_1$ represents H or $CH_3$;

$R_2$ represents H and alkyl radicals having from 1 to about 4 carbon atoms;

$R_3$ and $R_4$ each represents an alkyl radical having from 1 to about 6 carbon atoms;

$R_5$ represents alkyl, alkenyl, cycloalkyl, alkyl substituted cycloalkyl, aryl, aralkyl, alkaryl and heterocyclyl radicals having from 2 to about 18 carbon atoms; n represents an integer from 2 to about 6; and x represents a negatively charged salt-forming radical.

2. Prior Art

A wide variety of flotation-aid compositions comprising a copolymer of an acrylic compound and a polymerizable quaternary ammonium compound are known. U.S. Pat. Nos. 2,980,657; 3,585,148; 4,343,730; and 4,454,047, and JP59-024708 disclose polymers and copolymers of acrylic compounds and polymerizable quaternary amines. For example, JP59-024708 discloses copolymers of acrylamide and alkyl, hydroxy-substituted alkyl and hydroxy-substituted benzyl quaternaries of dialkylaminoalkylmethacrylamides; U.S. Pat. Nos. 2,980,657; 4,343,730 and 4,454,047 disclose copolymers of acrylic compounds and aliphatic alkyl, (polyalkoxy)alkyl, aralkyl, substituted aralkyl and phenoxyalkyl quaternaries of dialkylaminoalkylmethacrylamides; and U.S. Pat. No. 3,585,148 discloses polymers of acrylamide and alkyl, hydroxyalkyl and (polyalkoxy)alkyl quaternaries of diallylamine compounds. Other quaternaries, such as alkylsulfates, acetate and trimethyl quaternaries are also known. Note, for example, U.S. Pat. Nos. 3,883,491; 4,160,742; 4,179,549; 4,224,150; 4,330,450; 4,363,886; 4,387,017; and 4,405,015.

Despite the fact that many flotation-aids have been found useful in separating small amounts of oil and/or solid materials from aqueous systems, the oil processing and servicing industries, as well as the water treatment industry, are continually searching for more effective flotation-aids.

SUMMARY OF THE INVENTION

The present invention is concerned with novel compositions useful as flotation-aids comprising a copolymer of an acrylic compound, such as acrylamide, and a polymerizable 1-alkoxy-2-hydroxy propyl quaternary ammonium compound such as the 1-(p-tert-butylphenoxy)-2-hydroxy propyl quaternary of dimethylaminopropylmethacrylamide (DMAPMA). The present invention is also concerned with intermediates useful for preparing such flotation-aid compositions and with the use of reagents comprising such novel flotation-aid compositions for separating small amounts of oil and/or solid materials from aqueous systems.

DETAILED DESCRIPTION OF THE INVENTION

It has now been discovered that utilizing either 1-alkoxy-2-hydroxy propyl halides or glycidyl ethers to quaternize polymerizable tertiary amines greatly facilitates high yield quaternization under relatively mild conditions and that copolymerization of the corresponding novel quaternary ammonium compounds with an acrylic-type monomer produces compositions which have proven to be particularly useful as flotation-aids. Substantial improvements in flotation-aids are therefore achieved by copolymerizing an acrylic monomer with 1-alkoxy-2-hydroxy propyl quaternary ammonium compounds.

THE 1-ALKOXY-2-HYDROXY PROPYL HALIDE REACTANT

The 1-alkoxy-2-hydroxy propyl halide reactants which can be utilized in the present invention are generally represented by the formula

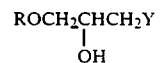

wherein

Y represents Cl or Br; and

R represents alkyl, alkenyl, cycloalkyl, alkyl substituted cycloalkyl, aryl, aralkyl, alkaryl, and heterocyclyl radicals having from 2 to about 18 carbon atoms.

It is known in the art that these reactants can be prepared by reacting substantially equimolar amounts of an alcohol with a halomethyl oxirane (an epihalohydrin), wherein the alcohol or phenol will react with the halomethyl oxirane to produce the corresponding 1-alkoxy-2-hydroxy propyl halide.

Suitable alcohols for use in preparing 1-alkoxy-2-hydroxy propyl halides useful in the practice of the present invention include, but are not limited to, saturated and unsaturated aliphatic alcohols, for example methyl, ethyl, dodecenyl, oleoyl, and aralkyl and substituted aralkyl, for example alkylbenzyl, such as octylbenzyl, and phenol and aryl, alkenyl and alkyl substituted phenols, for example p-ethyl phenol, p-n-propylphenol, p-n-butylphenol, p-t-octyl, and p-t-butylphenol.

Suitable halomethyl oxiranes include, but are not limited to, epichlorohydrin and epibromohydrin, particularly epichlorohydrin.

These 1-alkoxy-2-hydroxy propyl halide reactants are prepared by reacting a selected halomethyl oxirane with a selected alcohol in the presence of an effective amount of a catalyst, preferably a Lewis acid such as boron trifluoride etherate for aliphatic alcohols and the like, and preferably a base such as sodium hydroxide for phenols and the like.

The following non-limiting examples are for illustrative purposes only and represent the best mode for preparing the 1-alkoxy-2-hydroxy propyl halide reactants adapted to be utilized according to the teachings of the present invention.

EXAMPLE 1

A solution of 0.3 grams (0.002 mole) of $BF_3$ etherate in 26.0 grams (0.20 mole) of 2-ethyl hexanol was treated with 18.5 grams (0.20 mole) of epichlorohydrin. Slow warming to 50° C. was followed by a rapid exotherm to 140° C. The reaction mixture was subsequently stirred at 100° C. for 2 hours.

EXAMPLE 2

A solution of 0.3 grams (0.002 mole) of $BF_3$ etherate in 31.7 grams (0.20 mole) of 1-decanol was treated with 18.5 grams (0.20 mole) of epichlorohydrin. Slow warming at 40° C. was followed by a rapid exotherm to 130° C. The reaction mixture was subsequently stirred at 110° C. for 3 hours.

EXAMPLE 3

To a solution of 0.3 grams (0.002 mole) of $BF_3$ etherate in 37.3 grams (0.20 mole) of 1-dodecanol was added 18.5 grams (0.20 mole) of epichlorohydrin. Slow warming to 50° C. was followed by a rapid exotherm to 95° C. The product was stirred at 75° C. for another four hours.

EXAMPLE 4

A slurry of 31.3 grams (0.20 mole) of 4-t-butyl cyclohexanol in 18.5 grams (0.20 mole) of epichlorohydrin and 0.3 grams (0.002 mole) $BF_3$ etherate became clear on warming to 40° C. Slow warming to 50° C. was followed by a rapid exotherm to 85° C. The product was stirred to 75° C. for another 4 hours.

Other alcohols, including phenols, can also be utilized by merely replacing the alcohols of the foregoing examples with a selected other alcohol.

Where the alcohol is a phenol, it is preferable to substitute a base, such as sodium hydroxide, for $BF_3$. Other bases include, but are not limited to, potassium hydroxide and quaternary ammonium hydroxides.

Other halomethyl oxiranes, such as epibromohydrin can also be used by merely replacing the epichlorohydrin of the above examples with epibromohydrin to produce other 1-alkoxy-2-hydroxy propyl halides.

Other Lewis acids which can be substituted for boron trifluoride include, but are not limited to, zinc chloride and aluminum chloride.

THE GLYCIDYL ETHER REACTANT

The glycidyl ether reactants which can be utilized in the present invention are generally represented by the formula

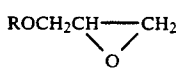

wherein R represents alkyl, alkenyl, cycloalkyl, alkyl substituted cycloalkyl, aryl, aralkyl, alkaryl, and heterocyclyl. Where R represents alkyl, alkenyl, cycloalkyl, alkyl substituted cycloalkyl, aralkyl and heterocyclyl radicals, the reactants can be prepared by reacting a 1-alkoxy-2-hydroxy propyl halide with sodium hydroxide. However, since this reaction would involve an additional step to the above-described preparation of the 1-alkoxy-2-hydroxy propyl halide reactants, it is preferable to use only those glycidyl ethers which are commercially available in economically feasible quantities, such as, for example, lauryl glycidyl ether. Where R represents aryl and alkaryl, the reactants can be prepared by reacting a phenol or a substituted phenol with a halohydrin in the presence of a base, such as sodium hydroxide.

POLYMERIZABLE TERTIARY AMINE REACTANT

In general, the polymerizable tertiary amine reactants which can be utilized in the present invention can be characterized as water soluble cationic vinyl monomers. More particularly, the polymerizable tertiary amine reactants are represented by N-substituted-(N',N'-dialkylaminoalkyl)acrylamides such as N-(N',N'-dimethylaminoethyl)methacrylamide, N-(N',N'-dimethylaminopropyl)acrylamide and such as N-(N',N'-dimethy)-N-alkylaminoalkyl)acrylamide. These reactants can be represented generally by the formula

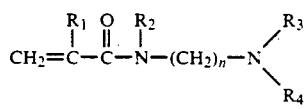

wherein
$R_1$ represents H or $CH_3$;
$R_2$ represents H and alkyl radicals having from 1 to about 4 carbon atoms;
$R_3$ and $R_4$ each represent an alkyl radical having from 1 to about 6 carbon atoms; and
n represents an integer from 2 to about 6.

It is contemplated that other polymerizable tertiary amines, such as dialkylaminoalkylacrylates, for example, dimethylaminoethylmethacrylate, can also be utilized. The present invention under conditions which will not hydrolyze the ester linkage.

THE QUATERNIZATION REACTION

The quaternization of a polymerizable tertiary amine with either a 1-alkoxy-2-hydroxy propyl halide or a glycidyl ether to produce the novel quaternary ammonium intermediate compounds of the present invention is accomplished by adding a selected one of either the 1-alkoxy-2-hydroxy propyl halide reactants, or the glycidyl ether reactants and hydrochloric acid, to a solution of the polymerizable tertiary amine to produce the corresponding quaternary ammonium compound represented generally by the formula

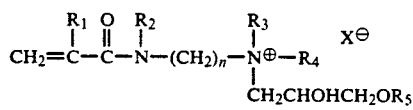

wherein
$R_1$ represents H or $CH_3$;
$R_2$ represents H and alkyl radicals having from 1 to about 4 carbon atoms;
$R_3$ and $R_4$ each represent an alkyl radical having from 1 to about 6 carbon atoms;

$R_5$ represents alkyl, alkenyl, cycloalkyl, alkyl substituted cycloalkyl, aryl, aralkyl, alkaryl and heterocyclyl radicals having from 2 to about 18 carbon atoms;

n represents an integer from 2 to about 6; and x represents a negatively charged salt-forming radical.

These quaternary ammonium compounds are novel intermediates useful in the production of flotation-aid compositions.

The following non-limiting examples are for illustrative purposes only and represent the best mode for carrying out the quaternization reaction of the present invention.

EXAMPLE 5

A 22.3 gram sample (0.10 mole) of the product of example 1 was treated with 17.0 grams (0.10 mole) of DMAPMA and 39.3 grams of deionized water. The creamy emulsion became clear after 30 minutes at 85° C. After 3 hrs a titration indicated a 75.7% degree of quaternization.

EXAMPLE 6

A 25.1 gram sample (0.10 mole) of the product of example 2 was treated with 17.0 grams (0.10 mole) of DMAPMA and 42.1 grams of water. The suspension became clear after 3 minutes at 85° C. After 3 hrs the degree of quaternization was 80% by titration.

EXAMPLE 7

To a solution of 17.0 grams (0.10 mole) of DMAPMA in 44.8 grams of deionized water was added 28.0 grams (0.10 mole) of the product of example 3. The creamy emulsion became clear after only 10 minutes at 85° C. After 3 hours the degree of quaternization was 80% by titration.

EXAMPLE 8

To a solution of 17.0 grams (0.10 mole) of DMAPMA in 42.0 grams of deionized water was added 25.0 grams (0.10 mole) of the product of example 4. The emulsion became clear after 15 minutes at 85° C. After 3 hours the degree of quaternization was 78.6% by titration.

EXAMPLE 9

To a solution of 17.0 grams (0.10 mole) of DMAPMA in 34.8 grams of water was added 10.0 grams (0.10 mole) of concentrated hydrochloric acid and 20.6 grams (0.10 mole) of p-t-butylphenyl glycidyl ether. The solution became clear after 2 hours at 75° C. After 12 hours the titration showed 92.6% quaternization.

EXAMPLE 10

To a mixture of 17.0 grams (0.10 mole) of DMAPMA and 28.1 grams (0.10 mole) of lauryl glycidyl ether in 42.5 grams of water was added 10.0 grams (0.10 mole) of concentrated HCl. The emulsion became clear after 3 hours at 75° C. and was heated for another 9 hours.

It is contemplated that other polymerizable tertiary amines of the general formula $$CH_2=\overset{R_1}{\underset{|}{C}}-\overset{O}{\underset{\|}{C}}-\overset{R_2}{\underset{|}{N}}-(CH_2)_n-N\overset{R_3}{\underset{R_4}{\diagup}}$$

wherein $R_1$ represents H or $CH_3$;

$R_2$ represents H and alkyl radicals having from 1 to about 4 carbon atoms;

$R_3$ and $R_4$ each represent an alkyl radical having from 1 to about 6 carbon atoms; and n represents an integer from 2 to about 6, such as dimethylaminoethylmethacrylamide, may be utilized according to the above procedure by substituting such amine for DMAPMA. It is also contemplated that dialkylaminoalkylacrylates may be utilized according to the above procedure by substituting such amine for DMAPMA.

Furthermore, it is also contemplated that other 1-alkoxy-2-hydroxy propyl halides capable of quaternizing an N-(N',N'-dialkylaminoalkyl)acrylamide and other glycidyl ethers capable of quaternizing an N-(N',N'-dialkylaminoalkyl)acrylamide may be utilized according to the above procedure by substituting such propyl halides or glycidyl ethers for those utilized in these examples.

ACRYLIC REACTANTS

The acrylic reactants useful in the present invention can be defined as any acrylic reactant that will copolymerize with an N-(N',N'-dialkyl-N'-(1-alkoxy-2-hydroxy propyl)aminoalkyl)acrylamide to produce a composition having flotation-aid activity. A preferred acrylic compound is acrylamide. It is contemplated that other acrylic compounds including alkylacrylamides having from 4 to 8 carbon atoms, such as methacrylamide, methyl acrylate, methyl methacrylate and acrylonitrile may be utilized by substituting such acrylic compound for acrylamide.

COPOLYMERIZATION

Copolymerization of an acrylic monomer with a 1-alkoxy-2-hydroxy propyl quaternary ammonium compound to produce a novel flotation-aid composition of the present invention is carried out by known methods of solution polymerization. The copolymers produced each have a molecular weight which is generally less than one million. Such copolymers are linear copolymers in that they are not cross-linked, although they may contain numerous branches from the linear backbone.

The following non-limiting examples are for illustrative purposes only and represent the best mode for carrying out the copolymerization to produce the novel compositions of the present invention which are particularly useful as flotation-aids.

GENERAL PROCEDURE

A solution of 50% acrylamide, and 50% DMAPMA quaternary solution prepared according to the quaternization procedure set forth above, was diluted to 15% active with deionized water and 2 to 3% of isopropanol (iPrOH). The monomer solution was adjusted to pH 4.5, sparged with nitrogen, warmed to 65° C., and initiated with 0.20 grams of 2',2'-Azobis-(2-amidinopropane) hydrochloride (ABIBA). A 3 to 5 minute induction period was followed by an exotherm to 78° C. After 6 hours at 70°–75° C., the polymer suspensions were cooled to room temperature.

| Example | DMAPMA Quat Type | Mole Ratio Quat/AM |
| --- | --- | --- |
| 11 | 1-dodecoxy-2-hydroxy propyl | 10/90 |
| 12 | 1-(n-butoxy)-2-hydroxy propyl | 5/95 |
| 13 | 1-(p-t-butylphenoxy)-2-hydroxy propyl | 10/90 |
| 14 | 1-decoxy-2-hydroxy propyl | 10/90 |
| 15 | 1-cyclohexoxy-2-hydroxy propyl | 10/90 |
| 16 | 1-(2-ethylhexoxy)-2-hydroxy propyl | 10/90 |

It is contemplated that other polymerization initiators, such as, for example, 2',2'-Azobis(isobutyronitrile), may be substituted fo ABIBA in these examples to achieve copolymerization.

This copolymerization procedure utilizing acrylamide and a DMAPMA quaternary yields a copolymer of recurring units represented generally by the formula

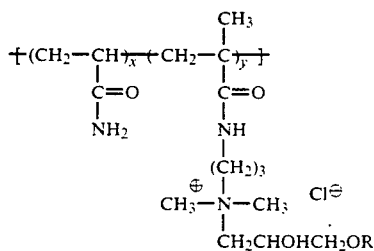

wherein
x represents an integer from 1 to about 19;
y represents an integer from 1 to 2; and
R represents alkyl, alkenyl, cycloalkyl, alkyl substituted cycloalkyl, aryl, aralkyl, alkaryl and heterocyclyl radicals having from 2 to about 18 carbon atoms.

REMOVAL OF OILS AND SOLIDS FROM AQUEOUS SYSTEMS

The flotation-aid compositions of the present invention are particularly useful in removing oils or solids, or combinations thereof, from aqueous systems. A reagent comprising a selected one of the copolymers of the present invention or a reagent comprising a combination of selected ones of such copolymers is introduced at any convenient point in the system. Such reagent can also include one or more additives including, but not limited to, water, a suitable solvent such as an alcohol, for example, isopropanol, a pour point depressant such as ethylene glycol, and a urea-type compound. It is then mixed with the oils or solids in any desired manner, such as by being pumped or by being circulated through the system, or by mechanical agitation such as by paddles or by gas agitation. After mixing, the mixture of oils or solids, or combinations thereof, and reagent is allowed to stand quiescent until the constituent phases of the emulsion separate. Settling times and optimum mixing times will, of course, vary with the nature of the oil or solid and the apparatus available. The operation, in its broadest concept, is simply the introduction of a reagent comprising a selected copolymer of the present invention into the oils or solids, the mixing of the two to establish contact and promote coalescence, and, usually, the subsequent quiescent settling of the agitated mixture to produce the aqueous and nonaqueous phases as stratified layers.

Agitation may be achieved in various way. The piping system through which the oil- or solids-containing system passes during processing may itself supply sufficient turbulence to achieve adequate mixing of the reagent and the system. Baffled pipe may be inserted in the flow sheet to provide agitation. Other devices such as perforated-chamber mixers, excelsior- or mineral- or gravel- or steelshaving-packed tanks, or beds of stone or gravel or minerals in open ducts or trenches may be employed beneficially to provide mixing. The introduction of a gas, such as natural gas or air, into a tank or pipe in which or through which the mixture of reagent and system is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range. However, such range is sufficiently wide to meet the tolerances required for the variances encountered daily in commercial operations.

Application of a suitable gas in a procedure approximating that of the froth flotation cell employed in ore beneficiation, after the present reagent has been added to the system to be resolved, frequently has a favorable influence of totally unexpected magnitude. By incorporating the step of subjecting the chemicalized (i.e., containing the reagent) system to the action of air in a sub-aeration type flotation cell, a clear aqueous layer is sometimes obtained in a matter of seconds, without added quiescent settling and with approximately as much reagent.

It should be distinctly understood that such aeration technique, while an important adjunct to the use of the present reagent, in some cases, is not an equivalent procedure. This may be proved by subjecting a non-chemicalized system to aeration for a period of minutes without detectable favorable effect. Addition of the reagent to such aerated system will, however, promptly produce resolution.

The order in which the reagent and the aeration step are applied is relatively immaterial. Sometimes it is more convenient to treat the system with the reagent and subsequently to apply the aeration technique. In others, it may be more advantageous to produce a strongly frothing system and then introduce the reagent into such aerated system.

Any desired gas can be substituted for air. Other commonly suitable gases include natural gas, nitrogen, carbon dioxide and oxygen, the gas being used essentially for its levitation effect. If any gas has some deleterious effect on any component of the system, it will obviously be desirable to use instead some other gas which is inert under the conditions of use.

The amount of compositions of this invention used will vary depending on the particular composition and the particular system. In general, the amount of composition employed in the system is at least about 0.5 ppm, such as from about 1.0 to 60 ppm, for example from about 5 to 40 ppm, but preferably from about 2.0 to 30 ppm. Larger amounts may be used but there is generally no cost/performance reason for so doing.

The following non-limiting examples are for illustrative purposes only and represent the best mode for utilizing the compositions of the present invention as flotation-aids.

EXAMPLE 17

At an oilfield by Wyoming, water containing oil and solid materials was extracted with trichloroethane and the percent transmittance was measured with a photometer. A reagent comprising the copolymer of Example 13 was added to the water and dispersed therein by the aeration technique hereinbefore described. The percent transmittance was increased from 55% to 96% at a dose of only two parts per million of copolymer.

EXAMPLE 18

In another Wyoming oilfield test, a reagent comprising the same copolymer as Example 17 increased the percent transmittance of the extracted water from 48% to 97% at a dose of 4 ppm of copolymer.

EXAMPLE 19

At an oilfied in California, a reagent comprising the same copolymer as Examples 17 and 18 reduced the turbidity of the water from 34 to 10 Jackson Turbudity Units (JTU) at a dose of 1 ppm of copolymer. The same performance was observed with the copolymer derived from acrylamide and the 1-(4-t-butylcyclohexyl)-2-hydroxy propyl quaternary of DMAPMA.

EXAMPLE 20

At an oilfield in Alberta, Canada, a reagent comprising the copolymer of Example 13 increased the transmittance of the extracted water from 57% to 80% at a dose of 8 ppm of copolymer. The same dose of a reagent comprising the copolymer of Example 15 increased the transmittance from 58% to 81%.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A method of removing oils, solids and combinations thereof from an aqueous system which comprises the steps of dispersing within said system an effective coalescing amount of a reagent comprising a copolymer of an acrylic compound and a compound of the formula:

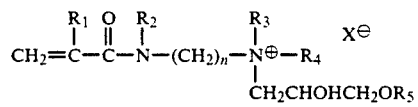

wherein
- $R_1$ represents H or $CH_3$;
- $R_2$ represents H or alkyl radicals having from 1 to about 4 carbon atoms;
- $R_3$ and $R_4$ each represent an alkyl radical having from 1 to about 6 carbon atoms;
- $R_5$ represents alkyl, alkenyl, cycloalkyl, alkyl substituted cycloalkyl, aryl, aralkyl, and alkaryl radicals having from 2 to about 18 carbon atoms;
- n represents an integer from 2 to about 6; and
- x represents a negatively charged salt-forming radical to afford aqueous and non-aqueous layers and removing the non-aqueous layer from the aqueous system.

2. The method of claim 1 wherein said reagent further includes water.

3. The method of claim 1 wherein said reagent further includes an alcohol solvent.

4. The method of claim 1 wherein said reagent further includes urea.

5. The method of claim 1 wherein said reagent further includes water, urea and a solvent.

* * * * *